(12) United States Patent
Huang et al.

(10) Patent No.: US 9,244,664 B1
(45) Date of Patent: Jan. 26, 2016

(54) SYSTEM FOR VIDEO DEVELOPMENT KITS WITH CONTROL OF EXECUTABLE SIZE

(71) Applicant: VisualOn, Inc., Santa Clara, CA (US)

(72) Inventors: Jiafa Huang, Shanghai (CN); Jun Lin, Shanghai (CN); Chin-Yee Lin, Los Gatos, CA (US)

(73) Assignee: VisualOn, Inc., San Jose, CA (US)

( * ) Notice: Subject to any disclaimer, the term of this patent is extended or adjusted under 35 U.S.C. 154(b) by 0 days.

(21) Appl. No.: 14/263,806

(22) Filed: Apr. 28, 2014

(51) Int. Cl.
*G06F 9/44* (2006.01)
*G06F 9/45* (2006.01)

(52) U.S. Cl.
CPC .................................. *G06F 8/443* (2013.01)

(58) Field of Classification Search
None
See application file for complete search history.

(56) References Cited

U.S. PATENT DOCUMENTS

| | | | | |
|---|---|---|---|---|
| 5,822,591 | A * | 10/1998 | Hochmuth | 717/148 |
| 5,911,070 | A * | 6/1999 | Solton | G06F 8/34 717/140 |
| 5,925,109 | A * | 7/1999 | Bartz | 710/14 |
| 6,279,151 | B1 * | 8/2001 | Breslau | G06F 8/423 717/140 |
| 6,381,735 | B1 * | 4/2002 | Hunt | 717/158 |
| 7,073,167 | B2 * | 7/2006 | Iwashita | 717/140 |
| 7,076,804 | B2 * | 7/2006 | Kershenbaum et al. | 726/30 |
| 7,103,878 | B2 * | 9/2006 | Fahs et al. | 717/130 |
| 7,140,003 | B2 * | 11/2006 | Decker | G06F 11/263 717/106 |
| 7,346,849 | B1 * | 3/2008 | Mulligan et al. | 715/763 |
| 7,496,889 | B2 * | 2/2009 | Sutter | G06F 8/425 717/141 |
| 7,523,450 | B2 * | 4/2009 | Cardinell | G06F 8/54 717/140 |
| 7,856,624 | B2 * | 12/2010 | Plum | G06F 8/41 717/106 |
| 7,971,194 | B1 * | 6/2011 | Gilboa | G06F 8/10 717/106 |
| 8,099,721 | B2 * | 1/2012 | Miceli | G06F 8/423 717/141 |
| 8,302,084 | B2 * | 10/2012 | Simon | G06F 8/75 717/141 |
| 8,869,123 | B2 * | 10/2014 | Mykland | 717/148 |
| 2003/0028864 | A1 * | 2/2003 | Bowen | G06F 8/48 717/141 |

(Continued)

OTHER PUBLICATIONS

Courbot, et al., "Efficient Off-Board Deployment and Customization of Virtual Machine-Based Embedded Systems", ACM 2010; [retrieved on Sep. 6, 2015]; Retrieved from Internet <URL;http://dl.acm.org/citation.cfm?id=1698772.1698779>; pp. 211-263.*

(Continued)

*Primary Examiner* — Xi D Chen
(74) *Attorney, Agent, or Firm* — Van Pelt, Yi & James LLP

(57) ABSTRACT

A system for controlling executable size of video development kits comprises an SDK. The SDK comprises a framework, an SDK library function, and a pointing function to deliver a pointer. The framework calls a pointing function. The SDK library function comprises a video processing function. The framework and the SDK library function are compiled into a video processing application. The pointing function points to the SDK library function. The pointing function includes a preprocessor conditional to remove a code section that refers to the SDK library function.

17 Claims, 4 Drawing Sheets

(56) References Cited

U.S. PATENT DOCUMENTS

| | | | |
|---|---|---|---|
| 2004/0039934 A1* | 2/2004 | Land et al. ............... | 713/200 |
| 2004/0117780 A1* | 6/2004 | Sea ................. | G06F 8/423 717/140 |
| 2006/0041873 A1* | 2/2006 | Pandarinathan ......... | G06F 8/71 717/141 |
| 2008/0028373 A1* | 1/2008 | Yang ................. | G06F 8/443 717/140 |
| 2010/0079489 A1* | 4/2010 | Cheng et al. ............ | 345/629 |
| 2011/0314442 A1* | 12/2011 | Bondhugula ............ | G06F 8/51 717/106 |
| 2014/0365995 A1* | 12/2014 | Gazzillo ................ | G06F 8/31 717/106 |

OTHER PUBLICATIONS

Reynolds, et al., "On the feasibility of an AOSD approach to Linux kernel extensions", 2008 ACM; [retrieved on Sep. 6, 2015]; Retrieved from Internet <URL;http://dl.acm.org/citation.cfm?id=1404891,1404899>; pp. 1-7.*

Soule, Foster, "Removal Bias: a New Cause of Code Growth in Tree Based Evolutionary Programming", 1998 IEEE;[retrieved on Sep. 6, 2015]; Retrieved from Internet <URL;http://ieeexplore.ieee.org/stamp/stamp.jsp?tp=&arnumber=700151>; pp. 781-786.*

Kotzmann, Mossenbock, "Run-Time Support for Optimizations Based on Escape Analysis"; 2007 IEEE; [retrieved on Sep. 6, 2015]; Retrieved from Internet <URL;http://ieeexplore.ieee.org/stamp/stamp.jsp?tp=&arnumber=4145104>; pp. 49-60.*

* cited by examiner

SYSTEM FOR VIDEO DEVELOPMENT KITS WITH CONTROL OF EXECUTABLE SIZE

BACKGROUND OF THE INVENTION

When providing a software developer kit (SDK) for video processing applications, it is desirable to include a large number of functionalities stored in libraries accessible to the software developer. The software developer may want to access all, some, or none of the functionalities. The SDK can additionally include a video processing application framework for executing basic video processing application functionality that can be expanded on by the developer. The libraries included in the SDK can be loaded by the video processing application either statically or dynamically.

Dynamic loading is a mechanism by which a computer program can, at run time, load a library into memory, retrieve the addresses of functions and variables contained in the library via names, execute those functions or access those variables, and unload the library from memory once the operations are done. This mechanism allows a computer program to startup in absence of these libraries, to discover available libraries, and to potentially gain additional functionalities. This makes it easy to control whether to use an additional functionality based on the results of dynamic loading. However, dynamic loading results in a slower application, due to the library load times, and the loss of optimizations possible by compiling the libraries together with the application. Dynamic loading can also cause problems if the version of the library loaded is not the version expected by the developer or if the library is not present, etc.

Static libraries avoid the problems of dynamic libraries, however, the advantages are lost as well. On the other hand, static libraries have a problem in that including a set of static libraries called by the framework requires all of the libraries to be linked to the final executable, increasing the executable size.

BRIEF DESCRIPTION OF THE DRAWINGS

Various embodiments of the invention are disclosed in the following detailed description and the accompanying drawings.

DETAILED DESCRIPTION

Figure 1:
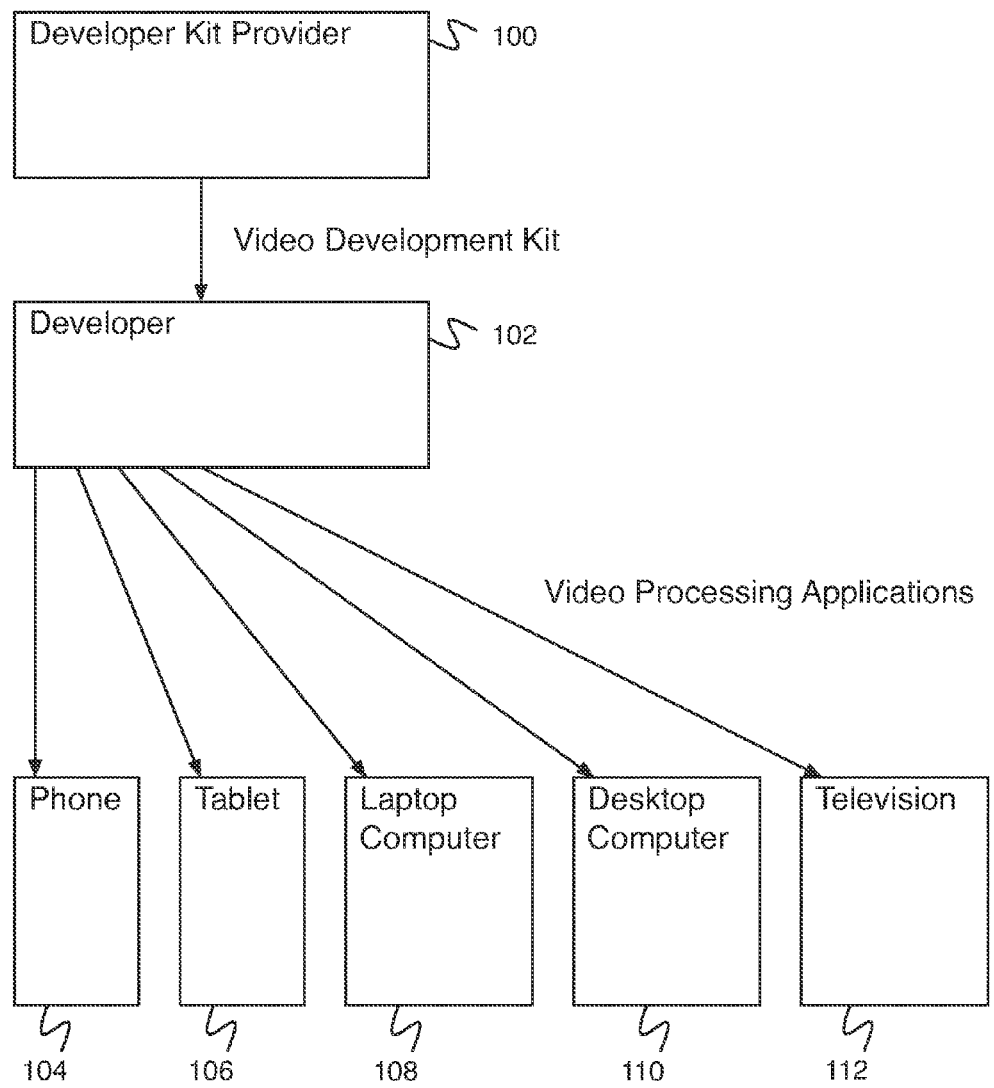
FIG. 1 is a block diagram illustrating an embodiment of a video application development workflow.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for video development kits is disclosed. A system for video development kits with control of executable size comprises an SDK, comprising: a framework, wherein the framework calls a pointing function; and an SDK library function wherein the SDK library function comprises a video processing function. The system for video development kits with control of executable size additionally comprises the pointing function to deliver a pointer, wherein the pointer points to the SDK library function, and wherein the pointing function includes a preprocessor conditional to remove a code section that refers to the SDK library function.

In some embodiments, a system for video development kits includes a set of library functions that are loaded statically, but achieve the benefits of dynamic loading. The system for video development includes an SDK including a video processing framework and a set of video processing library functions that are loaded statically. When software including static libraries is compiled, static library functionality that is not used is left out of the compiled application; however, the library functions are accessed by the framework and are thus all included in the final application. The system for video development kits indirectly accesses the static library functionality via a pointer function. Rather than calling the static library functionality directly, the framework calls the pointer function with the name of the desired library functionality. The pointer function returns a pointer to the desired library function, which is utilized by the framework to execute the desired functionality. In the event that the developer does not wish to utilize the library functionality, the developer removes the portion of the pointer function referring to the library functionality (e.g., using a preprocessor conditional). This removes the only reference to the library functionality in the application, and when the application is compiled, the unused library is left out of the final application, reducing the application size.

FIG. 1 is a block diagram illustrating an embodiment of a video application development workflow. In some embodiments, the video application development workflow of FIG. 1 is used by a set of developers to produce video processing applications. In various embodiments, video processing applications comprise video playing applications, video editing applications, video effects processing applications, video mixing applications, video compression applications, video transmission applications, or any other appropriate video processing applications. In the example shown, developer kit provider 100 provides a video development kit to developer 102. A video development kit comprises a software package for assisting in the development of video processing applications. In some embodiments, a video development kit includes a video software development kit (SDK). In various embodiments, a video SDK comprises a video processing application framework (e.g., a framework for coordinating the core functions of a video processing application), one or more video decoding libraries, one or more video processing libraries, one or more video playback libraries, or any other appropriate video SDK software. In some embodiments, a video development kit additionally comprises a pointing function for indirectly referring to a library function. In some embodiments, developer kit provider 100 and developer 102 comprise developers working for the same video processing application development organization. In some embodiments, developer kit provider 100 comprises a separate organization from developer 102, and developer kit provider 100 provides (e.g., sells, licenses, provides for free, etc.) the video development kit to developer 102. Developer 102 provides a video processing application or applications to one or more video devices (e.g., phone 104, tablet 106, laptop computer 108, desktop computer 110, television 112, etc.). In various embodiments, developer 102 provides the same application to each of a set of video devices, provides a set of applications with common functionality but modified to work under different operating systems to each of a set of video devices, provides a set of applications with common functionality but modified to use video with different encodings to each of a set of video devices, provides a set of applications comprising a range of different functionalities to each of a set of video devices, or provides any other appropriate video processing applications.

Figure 2:
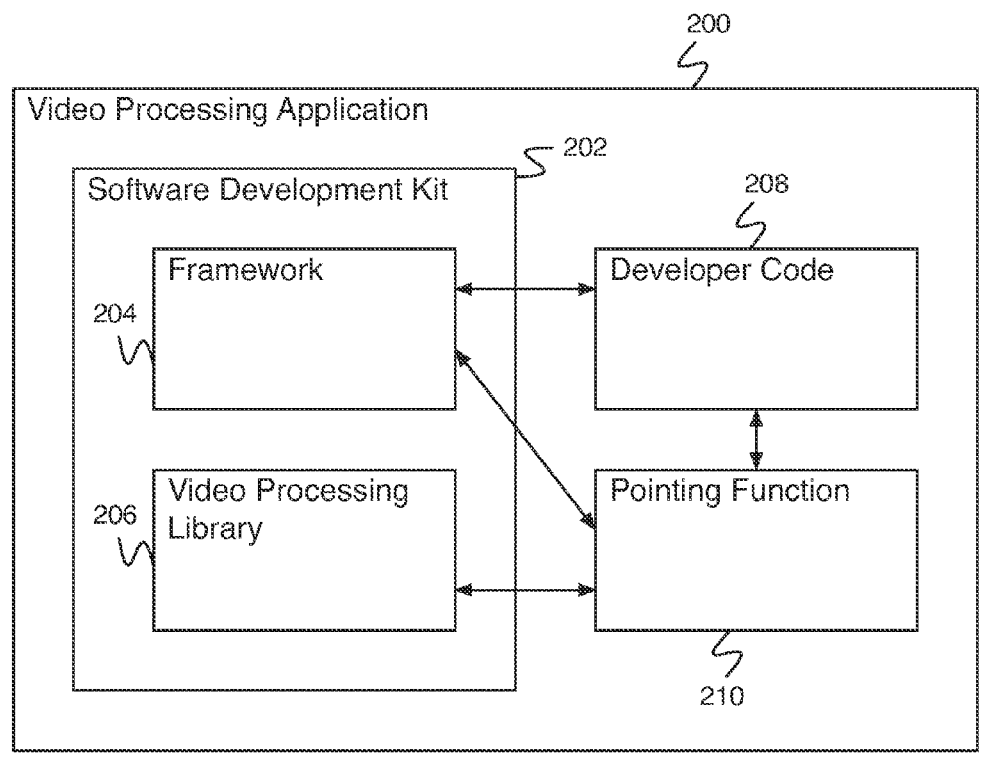
FIG. 2 is a block diagram illustrating an embodiment of a video processing application.

FIG. 2 is a block diagram illustrating an embodiment of a video processing application. In some embodiments, video processing application 200 comprises a video processing application provided by a developer (e.g., developer 102 of FIG. 1) to one or more video devices. In the example shown, video processing application 200 comprises software development kit 202. Software development kit 202 comprises framework 204 (e.g., a framework for providing the basic functions of a video processing application). Software development kit 202 additionally comprises video processing library 206. In some embodiments, software development kit 202 comprises a plurality of video processing libraries. Video processing library 206 comprises one or more video processing functions utilized by framework 204 as part of the functionality of a video processing application. In various embodiments, video processing library 206 comprises video decoding functions, video processing functions, video playback functions, or any other appropriate video functions. In some embodiments, video processing library 206 comprises a statically linked library. In the example shown, video processing application 200 additionally comprises developer code 208. Developer code 208 interacts with framework 204 and utilizes functionality from video processing library 206 to create a custom video processing application. Pointing function 210 comprises a pointing function for delivering a pointer pointing to a library function. In some embodiments, software development kit 202 and pointing function 210 comprise a video development kit. In some embodiments, pointing function 210 receives a name of a library function and returns a pointer to the function in video processing library 206. In some embodiments, a video development kit comprises a pointing function definition that is implemented by a developer. In some embodiments, the pointing function is modified by the developer as desired.

Framework 204 and developer code 208 utilize pointing function 210 for accessing functions in video processing library 206. In some embodiments, pointing function 210 additionally comprises a preprocessor conditional to remove a code section that refers to a function in video processing library 206. In some embodiments, each code section in pointing function 210 referring to a function in video processing library 206 can be removed using a preprocessor conditional. In the event the developer developing video processing application 200 determines that a library function in video processing library 206 is not necessary for video processing application 200, the developer indicates for the preprocessor conditional to remove the code section referring to the library function from pointing function 210. Removing the code section referring to a library function from pointing function 210 causes there to be no reference to the library function anywhere within video processing application 200. In some embodiments, when software including a statically linked library is compiled, any library function that is not referred to is removed on compilation. In this way a developer can make use of a software development kit including a statically linked library comprising many different functions and a framework making use of those functions, while causing any functions not necessary for the finished application to be left out of the compiled code.

Figure 3:
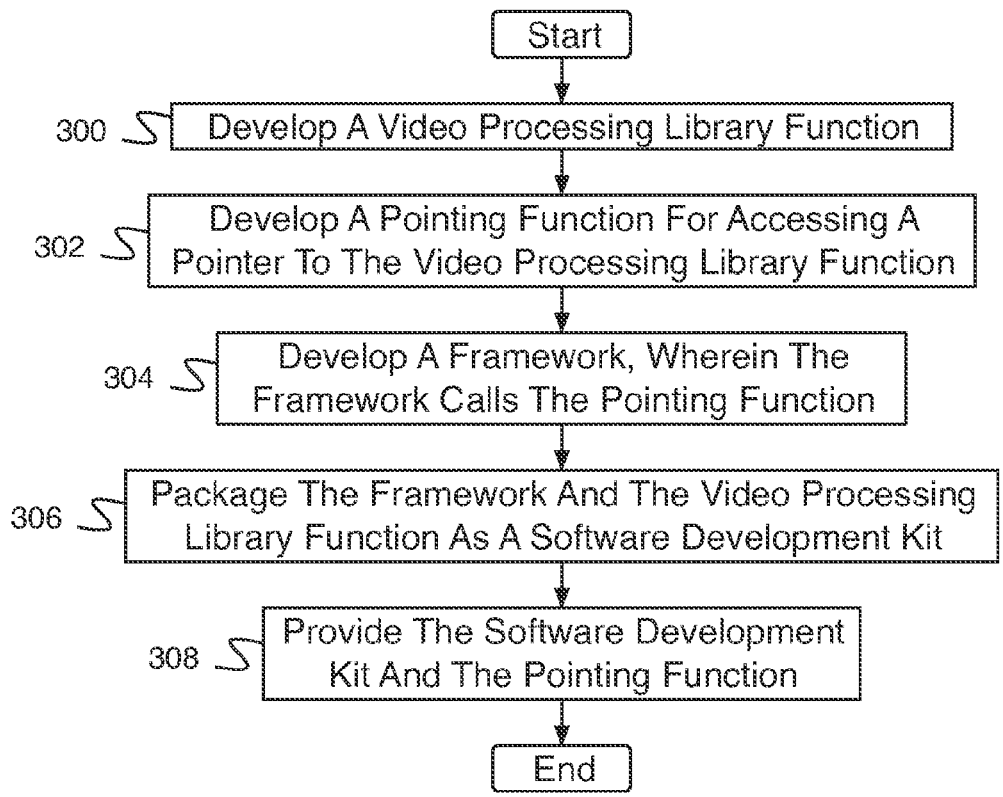
FIG. 3 is a flow diagram illustrating an embodiment of a process for providing a video development kit.

FIG. 3 is a flow diagram illustrating an embodiment of a process for providing a video development kit. In some embodiments, the process of FIG. 3 is used by a development kit provider (e.g., development kit provider 100 of FIG. 1). In the example shown, in 300, a video processing library function is developed. In various embodiments, the video processing function comprises a video decoding function, a video playback function, a function for preparing video data for playback, a video stream initialization function, a video stream open function, a video stream buffer retrieval function, a video stream uninitialization function, or any other appropriate video processing function. In 302, a pointing function for accessing a pointer to the video processing library function is developed. In 304, a framework is developed, wherein the framework calls the pointing function. In some embodiments, the framework accesses the library function via the pointer. In some embodiments, the framework can use the function set to get a buffer from HLS URL. In 306, the framework and the video processing library function are packaged as a software development kit. In 308, the software development kit and the pointing function are provided (e.g., to a developer, e.g., developer 102 of FIG. 1).

Figure 4:
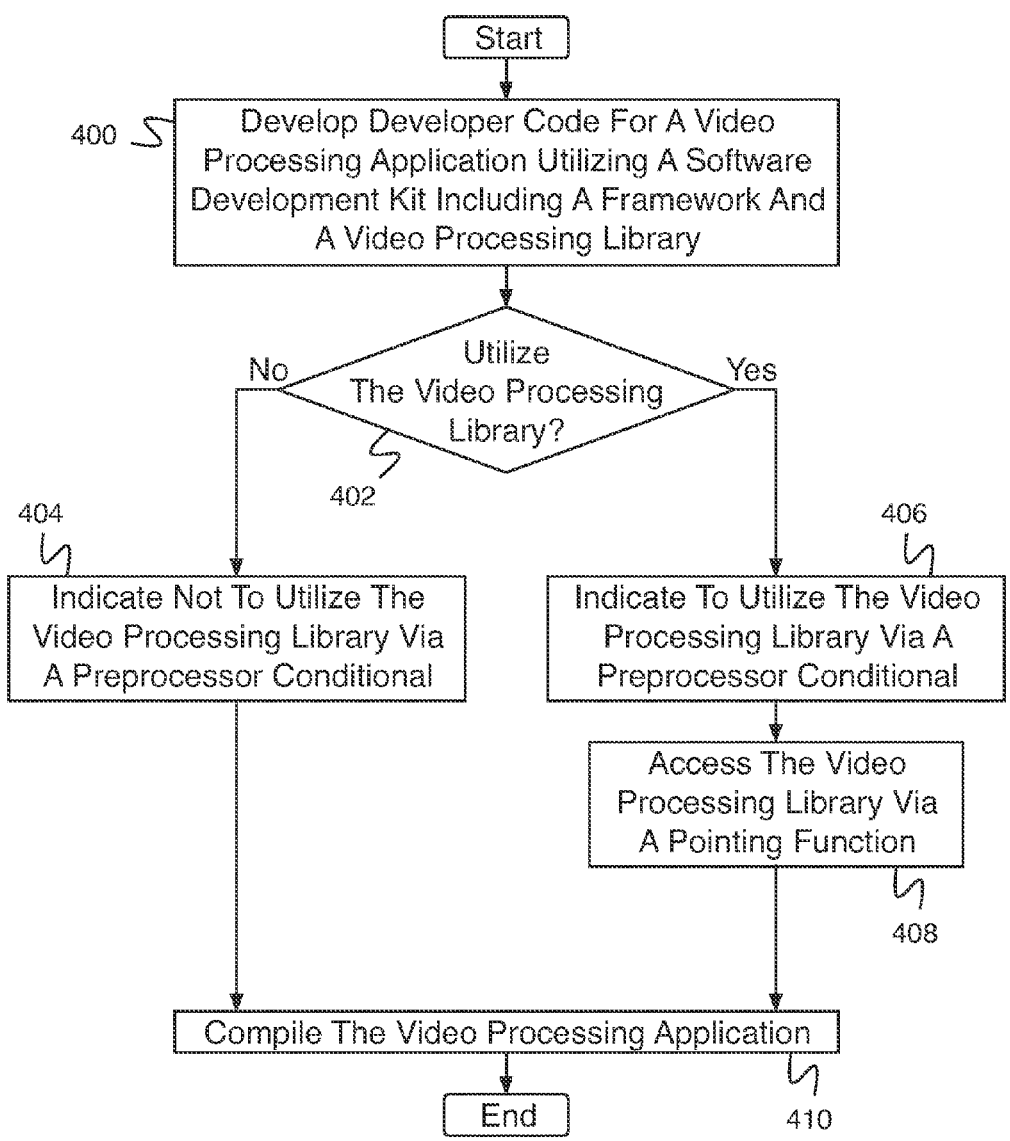
FIG. 4 is a flow diagram illustrating an embodiment of a process for using a video development kit.

FIG. 4 is a flow diagram illustrating an embodiment of a process for using a video development kit. In some embodiments, the process of FIG. 4 is used by a developer (e.g., developer 102 of FIG. 1). In 400, developer code for a video processing application utilizing a software development kit including a framework and a video processing library is developed. In 402, it is determined whether to utilize the video processing library. In the event it is determined not to utilize the video processing library, control passes to 404. In 404, it is indicated not to utilize the video processing library via a preprocessor conditional. Control then passes to 410. In the event it is determined in 402 to utilize the video processing library, control passes to 406. In 406, it is indicated to utilize the video processing library via a preprocessor conditional. In 408, the video processing library is accessed via a pointing function. Control then passes to 410. In 410, the video processing application is compiled, and the process ends. In some embodiments, the video processing library comprises a set of functions, and each function of the set of functions is can be indicated to be utilized or not utilized via its own preprocessor conditional. In some embodiments, the software development kit comprises a set of video processing libraries, and each library of the set of libraries is can be indicated to be utilized or not utilized via its own preprocessor conditional.

A code section is shown below illustrating an embodiment of code accessing a video processing library function (e.g., GetFunctionSetHLS) via a pointing function (e.g., GetFuncPointer):

```
typedef void (* FunctionSetHLSPointer) (FunctionSetHLS *pSet);
FunctionSetHLS cFunctionSetHLS;
memset(&cFunctionSetHLS, 0, sizeof(FunctionSetHLS));
FunctionSetHLSPointer pFunc=GetFuncPointer("GetFunctionSetHLS");
if (NULL !=pFunc) {
pFunc(&cFunctionSetHLS);
}
else {
// disable HLS
return;
}
// use HLS
void *handle=NULL;
cFunctionSetHLS.Init(&handle);
...
```

A code section is shown below illustrating an embodiment of code for a function for accessing a set of library functions:

```
typedef struct
{
int (* Init)(void** handle);
int (* Open)(void* handle, string url);
int (* GetBuffer)(void* handle, void** buffer);
int (* Uninit)(void* handle);
} FunctionSetHLS;
void GetFunctionSetHLS(FunctionSetHLS *pSet)
{
pSet->Init=HLSInit;
pSet->Open=HLSOpen;
pSet->GetBuffer=HLSGetBuffer;
pSet->Uninit=HLSUninit;
}
```

In some embodiments, GetFunctionSetHLS provides the function set of preparing HLS video date.

A code section is shown below illustrating an embodiment of code for a pointing function (e.g., GetFuncPointer) allowing access to a set of video processing library functions (e.g., GetFunctionSetHLS, GetFunctionSmoothStream, GetFunctionSetDash):

```
#define_ENABLE_HLS 1
#define_ENABLE_SMOOTHSTREAM 1
#define_ENABLE_DASH 1
void* GetFuncPointer(const char *pFunctionName)
{
if (NULL==pFunctionName) {
return NULL;
}
#if (_ENABLE_HLS)
if (0==strcmp(pFunctionName, "GetFunctionSetHLS")) {
return (void *) GetFunctionSetHLS;
}
#endif
#if (_ENABLE_SMOOTHSTREAM)
if (0==strcmp(pFunctionName, "GetFunctionSetSmoothStream")) {
return (void *) GetFunctionSetSmoothStream;
}
#endif
#if (_ENABLE_DASH)
if (0==strcmp(pFunctionName, "GetFunctionSetDash"))
{
return (void *) GetFunctionSetDash;
}
#endif
return NULL;
}
```

In the example shown, a developer can indicate to a preprocessor conditional whether a code section is to be included in the code to be compiled via a corresponding preprocessor constant (e.g., #define_ENABLE_HLS 1).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for controlling executable size of video development kits, comprising:
removing, using a processor, at least one code section, wherein the at least one code section comprises a pointing function that points to the at least one corresponding function of a SDK library function, wherein the pointing function includes the preprocessor conditional to remove the at least one code section, wherein in the event that the preprocessor conditional removes the at least one code section, the at least one code section is removed from a first pointing function to obtain a second pointing function, the second pointing function being smaller than the first pointing function, wherein the pointing function is to deliver a pointer, wherein the SDK library function comprises a video processing function, wherein a framework calls the pointing function, wherein the framework and the SDK library function are compiled into a video processing application, and wherein an SDK comprises the framework and the SDK library function compiling the framework and the SDK library function into the video processing application.

2. A system for controlling executable size of video development kits, comprising:
an SDK comprising:
a framework, wherein the framework calls a pointing function;
an SDK library function, wherein the SDK library function comprises a video processing function, wherein the framework and the SDK library function are compiled into a video processing application; and
the pointing function to deliver a pointer,
wherein the pointing function comprises at least one code section that points to at least one corresponding function of the SDK library function; and
wherein the pointing function includes a preprocessor conditional to remove the at least one code section, wherein in the event that the preprocessor conditional removes the at least one code section, the at least one code section is removed from a first pointing function to obtain a second pointing function, wherein the second pointing function being smaller than the first pointing function;
one or more processors configured to:
remove the at least one code section; and
compile the framework and the SDK library function into a video processing application; and one or more memories coupled to the one or more processors and configured to provide the one or more processors with instructions.

3. The system of claim 2, wherein the at least one code section is removed on compilation.

4. The system of claim 1, wherein the SDK library function corresponding to the at least one code section is removed on compilation.

5. The system of claim 2, wherein the video processing function comprises a video decoding function.

6. The system of claim 2, wherein the video processing function comprises a video playback function.

7. The system of claim 2, wherein the video processing function comprises a function for preparing video data for playback.

8. The system of claim 2, wherein the framework comprises a framework for coordinating the core functions of a video processing application.

9. The system of claim 8, wherein the video processing application comprises a video player.

10. The system of claim 8, wherein the video processing application comprises a video editor.

11. The system of claim 8, wherein the video processing application comprises a video effects processor.

12. The system of claim 2, wherein the preprocessor conditional comprises a #if statement.

13. The system of claim 2, wherein it is indicated to the preprocessor conditional whether to remove the code section using a corresponding preprocessor constant.

14. The system of claim 2, wherein the system comprises a plurality of SDK library functions.

15. The system of claim 2, wherein the pointing function comprises a pointing function definition that is implemented by a developer.

16. The system of claim 2, wherein the pointing function receives a function name and returns a pointer to a function corresponding to the function name.

17. A computer program product for controlling executable size of video development kits, the computer program product being embodied in a non-transitory computer readable storage medium and comprising computer instructions for:

removing, using a processor, at least one code section, wherein the at least one code section comprises a pointing function that points to the at least one corresponding function of a SDK library function, wherein the pointing function includes the preprocessor conditional to remove the at least one code section, wherein in the event that the preprocessor conditional removes the at least one code section, the at least one code section is removed from a first pointing function to obtain a second pointing function, the second pointing function being smaller than the first pointing function, wherein the pointing function is to deliver a pointer, wherein the SDK library function comprises a video processing function, wherein a framework calls the pointing function, wherein the framework and the SDK library function are compiled into a video processing application, and wherein an SDK comprises the framework and the SDK library function compiling the framework and the SDK library function into the video processing application.

* * * * *